United States Patent [19]

Szabo

[11] Patent Number: 5,492,371
[45] Date of Patent: Feb. 20, 1996

[54] GARTER SPRING STUFFER PACK QUICK CONNECTOR

[75] Inventor: George Szabo, Ortonville, Mich.

[73] Assignee: ITT Corporation, New York, N.Y.

[21] Appl. No.: 333,444

[22] Filed: Nov. 2, 1994

[51] Int. Cl.[6] .................................................. F16L 55/00
[52] U.S. Cl. ........................... 285/23; 285/318; 285/351; 29/237
[58] Field of Search .............................. 285/23, 318, 321, 285/319, 315, 316; 29/237, 890.14, 451, 522.1

[56] References Cited

U.S. PATENT DOCUMENTS

| | | | |
|---|---|---|---|
| 4,093,279 | 6/1978 | Verdesca et al. | 285/23 |
| 4,193,616 | 3/1980 | Sarson et al. | 285/321 X |
| 4,376,525 | 3/1983 | Fremy | 285/321 X |
| 4,632,434 | 12/1986 | Proctor et al. | 285/318 X |
| 4,647,012 | 3/1987 | Gartner | 285/23 X |
| 5,342,095 | 8/1994 | Klinger | 285/318 X |
| 5,364,131 | 11/1994 | Hartsock et al. | 285/23 |

Primary Examiner—Dave W. Arola

[57] ABSTRACT

A quick connector assembly for coupling a flexible hose or tube to a bore formed in a housing thereby to establish fluid communication between the interiors of the hose and bore, respectively, comprises an elongate tubular male insert having one end adapted to receive and retain the tube about its periphery. The other end of the male insert includes a contoured external surface defining an external locking flange, and a pair of axially-spaced external circumferential grooves for receiving a pair of O-rings which ultimately sealingly engage complementary cylindrical sections of the housing bore upon insertion of the connector assembly thereinto. Prior to its insertion into the housing bore, the connector assembly includes a garter spring which is radially collapsed about the male insert's contoured external surface by an encompassing annular spring guide. Upon inserting the connector assembly into the housing bore, the spring guide first seats itself against the housing and the garter spring is thereafter displaced by the locking flange from its radially-collapsed pre-insertion position within the spring guide down into the housing bore and, ultimately, into a locking groove formed internally of the housing bore. The garter spring thereafter further expands to allow the locking flange to pass therethrough and then radially contracts upon full insertion of the male insert into the housing bore to lock the connector assembly therein.

6 Claims, 1 Drawing Sheet

FIG 1
FIG 2
FIG 3
FIG 4
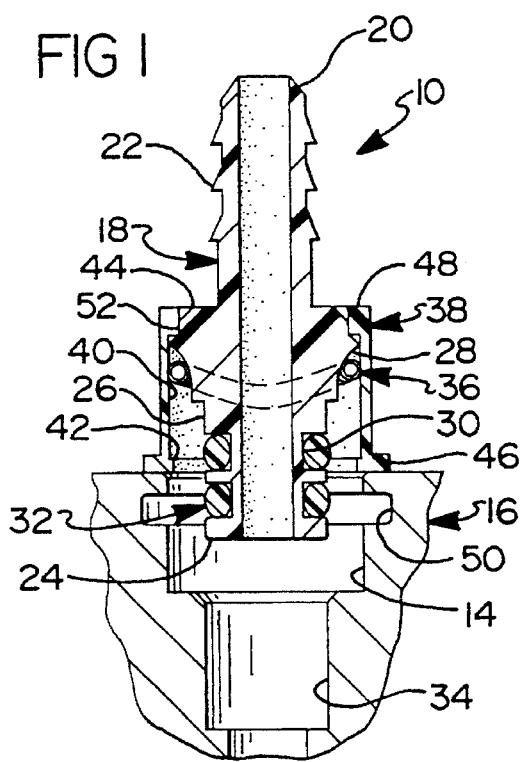
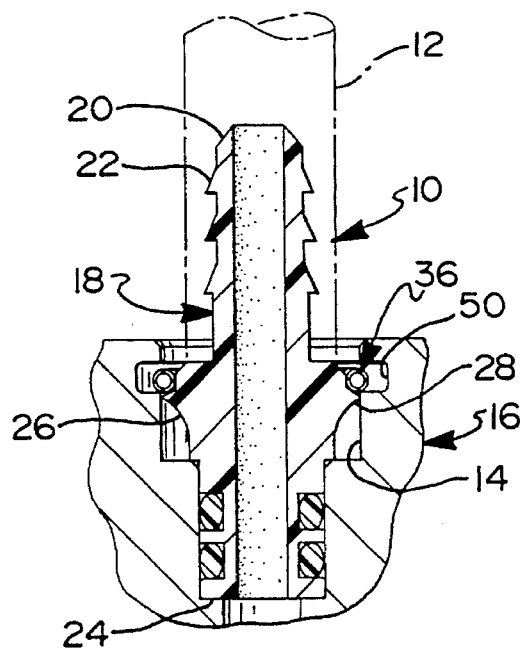
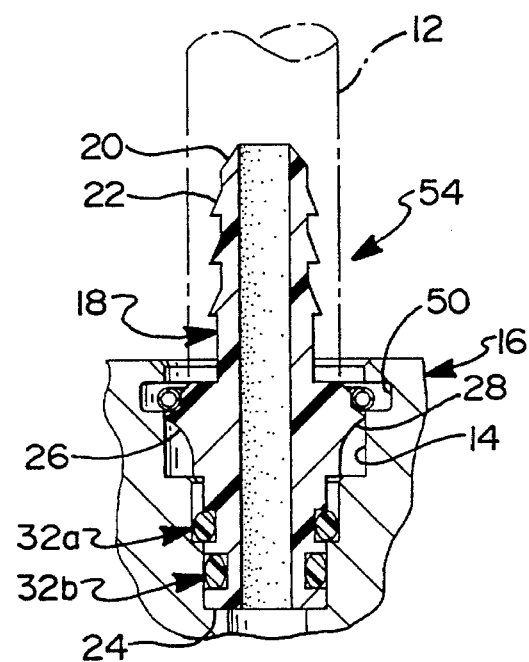

GARTER SPRING STUFFER PACK QUICK CONNECTOR

TECHNICAL FIELD

This invention generally relates to low-profile, quick connector assemblies adapted for releasably coupling a tube to a bore formed in an external surface of a housing to establish fluid communication between the interior of the tube and the interior of the housing bore. More specifically, this invention relates to quick-connect coupling assemblies of the "avalanche" type, wherein a relatively small axial displacement or coupling "stroke" is required to fully seat and lock the connector assembly, as measured from the point at which any portion of the connector assembly first makes facial contact with the housing bore.

BACKGROUND OF THE INVENTION

Known connector assemblies for releasably coupling a flexible hose or tube to a bore formed in an external surface of a housing typically comprise elongate male inserts which utilize a plurality of axially-spaced circumferential grooves of different nominal diameter between which is deployed a suitable radially-expandable locking element, such as a garter spring, during insertion of the connector assembly into the housing bore. As a result, these known connector assemblies require a relatively great amount of axial travel or coupling stroke in order to fully insert and lock the connector assembly into the housing bore. These relatively great coupling strokes in turn precipitate the need for greater accuracy in aligning the connector with the housing bore prior to its insertion, and greater care must also be exercised by the installer in order to ensure proper deployment of the garter spring between its several grooves. Unfortunately, any increased frictional resistance encountered by the installer during insertion of prior art connector assemblies may convey a false impression of a completed connection, even though the connector assembly is not fully installed within the housing bore.

SUMMARY OF THE INVENTION

It is an object of the invention to provide an "avalanche-type" or short-coupling-stroke, low-profile, quick connector for coupling a tube to a bore formed in a housing, as might be useful for connecting a vacuum hose to a vehicle's engine block.

It is another object of the invention to provide a short-coupling-stroke, low-profile, quick connector for releasably connecting a tube to a bore formed in a housing, whereby the connector may be nondestructively removed from the housing bore with a suitable extraction tool.

Under the present invention, a connector assembly (for coupling a tube to a bore formed in a housing to establish fluid communication between the interior of the tube and the interior of the bore) includes an elongate, tubular, male insert having a first longitudinal end adapted to receive the tube, and a second longitudinal end adapted to be received in the housing bore and having a contoured external surface defining an external circumferential locking flange. The connector assembly further includes a resilient locking element, such as a garter spring, encircling the contoured external surface on the male insert and expandable over its locking flange upon insertion of the male insert into the housing bore. The connector assembly also includes an annular guide encompassing the garter spring and the male insert's locking flange prior to insertion of the male insert into the housing bore. The guide serves to radially collapse the garter spring about the contoured external surface of the male insert until the garter spring is displaced by the male insert's locking flange down into the housing bore and, ultimately, into a complementary circumferential groove inside the housing bore.

More specifically, upon insertion of the male insert into the housing bore, one side of the locking flange serves to axially displace the garter spring disposed about the male insert's contoured external surface from a radially-collapsed pre-insertion position within the spring guide to a post-insertion position within the bore's internal circumferential locking groove, wherein the garter spring is permitted to further expand to allow the locking flange to pass therethrough, with the garter spring thereafter radially contracting into its final locking position within the bore's internal groove on the other side of the locking flange.

In a preferred embodiment of the quick connector assembly of the present invention, a pair of O-rings are seated in a pair of axially-spaced circumferential grooves also defined in the contoured external surface on the male insert. Upon insertion of the connector assembly into the housing bore, the O-rings engage opposed cylindrical bore surfaces to provide a fluid-tight seal between the connector assembly and the housing bore.

BRIEF DESCRIPTION OF THE DRAWINGS

Referring to the drawings, wherein like reference numerals are used to designate like elements in each of the several figures, FIG. 1 is a partial cross-sectional view of a first preferred embodiment of the connector assembly of the invention immediately prior to its insertion into a complementary bore formed in an external surface of a housing, with its garter spring being radially collapsed by the interior surface of an annular spring guide;

FIG. 2 is a partial cross-sectional view of the quick connector of FIG. 1 upon its installation within the housing bore, with its garter spring radially expanded into the bore's complementary internal circumferential groove and over an external circumferential locking flange on the connector assembly to lock the connector assembly therein;

FIG. 3 is a partial cross-sectional view of a second preferred embodiment of the present quick connector immediately prior to its insertion into a complementary bore formed in an external surface of a housing, with its garter spring being radially collapsed by the internal surface of an annular spring guide; and FIG. 4 is a partial cross-sectional view of the quick connector of FIG. 3 upon its installation within the housing bore, with its garter spring radially expanded into the bore's complementary internal groove and over the connector assembly's external locking flange to lock the connector assembly therein.

DETAILED DESCRIPTION OF THE PREFERRED EMBODIMENTS

A first preferred embodiment 10 of the quick connector assembly of the present invention for releasably connecting a flexible hose or tube 12 with a complementary bore 14 formed in an external surface of a housing 16 is shown in FIGS. 1 and 2. The connector assembly 10 includes an elongated, tubular, male insert 18 having a first longitudinal end 20 whose external surface is adapted to receive and retain the tube 12 about its periphery as through the use of axially-spaced circumferential retaining flanges 22. The second longitudinal end 24 of the male insert 18, itself adapted to be received in the housing bore 14, includes a contoured external surface 26 defining an external locking flange 28. The contoured external surface 26 also defines a pair of axially-spaced external circumferential grooves 30 for receiving a pair of O-rings 32. The O-rings 32 ultimately engage a complementary cylindrical section 34 of the housing bore 14 upon insertion of the connector assembly 10 thereinto, thereby establishing a fluid-tight seal between the male insert 18 and the housing bore 14.

As preassembled, and prior to its insertion into the housing bore 14, the connector assembly 10 includes a garter spring 36 which is radially collapsed about the male insert's contoured external surface 26 by an encompassing annular spring guide 38. The spring guide 38, whose internal surface 40 is generally adapted to permit the garter spring 36 to slide axially therein during the insertion of the connector assembly 10 into the housing bore 14, is itself preferably provided with an internal flange 42,44 at its first and second longitudinal ends 46,48, respectively, to aid preassembly of the connector assembly 10. More specifically, the first internal flange 42 on the spring guide's first end 46 has a nominal internal diameter greater than that of the locking flange 28 on the male insert 18, while the second internal flange 44 on the spring guide's second end 48 has a nominal internal diameter less than that of the male insert's locking flange 28.

During preassembly, the first end 20 of the male insert 18 is inserted through the spring guide 38, with the locking flange 28 on the male insert 18 passing through the spring guide's first internal flange 42 to ultimately seat against the spring guide's second internal flange 44 at its second end 48. The garter spring 36, whose nominal outer diameter is greater than the internal diameter of the spring guide's internal surface 40, is thereafter inserted into the spring guide 38 past its first internal flange 42. The garter spring 36 is thereafter retained in a radially-collapsed condition about the contoured external surface 26 of the male insert 18 by the internal surface 40 of the spring guide 38 and either the spring guide's first internal flange 42, the male insert's locking flange 28, or both. In this regard, it is noted that the garter spring 36 may be a stainless steel coil spring that is connected at its free ends to form a continuous loop. However, it should be appreciated that the invention contemplates the use of any annular or even arcuate resilient locking element which may be radially collapsed or compressed into the interior of the spring guide 38 during preassembly of the connector assembly 10 and, as will be further described below, correlatively radially expanded over the male insert's locking flange 28 during insertion of the connector assembly 10 into the housing bore 14.

During insertion of the connector assembly 10 into the housing bore 14, the first end 46 of the spring guide 38 is seated against the housing 16 in the manner illustrated in FIG. 1. Upon further axial displacement of the male insert 18 into the housing bore 14, the garter spring 36 is displaced by the male insert's locking flange 28 from its radially-collapsed preassembly position within the spring guide 38 out its first end 46, down into the housing bore 14 and, ultimately, into a circumferential locking groove 50 formed internally of the housing bore 14. As noted above, with still further axial displacement of the male insert 18 into the housing bore 14, the garter spring 36 radially expands to allow the male insert's locking flange 28 to pass therethrough. The garter spring 26 then radially contracts about the contoured surface 26 of the male insert 18 to reach its final, installed position on a radial shoulder 52 on the male insert's contoured surface 26, as shown in FIG. 2. In this regard, it is noted that the nominal diameter of the radial shoulder 52 on the male insert's contoured surface 26 is such that the garter spring 36 extends within the housing bore's circumferential locking groove 50, thereby locking the garter spring 36 within the locking groove 50 and, correlatively, locking the connector assembly 10 within the housing bore 14.

As should be appreciated from the above, the force required to insert the present connector assembly 10 into the housing bore 14 is minimal because it only requires overcoming the frictional engagement of the O-rings 32 with their complementary bore section 34 and the radially-collapsed garter spring 36 with the spring guide's interior surface 40 (and thereafter, possibly, the bore opening), and the expansion of the garter spring 36 about the male insert's locking flange 28. And, in the first preferred embodiment 10 of the present connector assembly, the expansion of the garter spring 36 is facilitated by the preferably inclined contoured external surface 26 of the male insert 18. Moreover, since the preassembly position of the garter spring 36 is within the spring guide 38 rather than being in a preassembly groove located either about the external surface of the male insert or within the interior of the bore, as is typical of the prior art, the present connector assembly 10 features a shortened stroke as compared to prior art configurations.

In accordance with another feature of the invention, the connector assembly 10 may thereafter be removed from the housing bore 14 as through insertion of a suitable tool (not shown) capable of radially expanding the garter spring 36 within the bore's locking groove 50 so as to permit passage therethrough of the male insert's locking flange 28.

A second preferred embodiment 54 of the quick connector of the present invention is shown in FIGS. 3 and 4. As described above with respect to the first embodiment 10, the second embodiment 54 includes an elongate tubular male insert 18 whose first longitudinal end 20 is adapted to receive a flexible hose or tube 12, and whose second longitudinal end 24 is adapted to be received in the complementary housing bore 14.

The second preferred embodiment 54 further likewise includes a contoured external surface 26 on the male insert's second end 24 defining an external circumferential locking flange 28 and a pair of axially-spaced external circumferential grooves 30a,30b in which a pair of O-rings 32a,32b are respectively seated for ultimate sealing engagement with complementary cylindrical sealing surfaces 34a,34b formed in the housing bore 14, respectively.

And, as in the first embodiment 10, as preassembled, a spring guide 38 serves to retain and radially collapse a garter spring 36 about the contoured external surface 26 of the male insert 18, with the garter spring 36 being axially displaced from within the spring guide 38 during insertion of the connector assembly 54 into the housing bore 14 to ultimately expand into a circumferential locking groove 50 formed internally of the housing bore 14, expanding further over the locking flange 28 on the male insert 18, and finally coming to rest on a similar radial shoulder 52 on the male insert's contoured external surface 26.

However, unlike the first embodiment 10, wherein both of the male insert's axially-spaced external circumferential grooves 30, O-rings 32, and complementary bore sealing surfaces 34 are respectively of like size and/or nominal diameter, the second preferred embodiment 54 of the present connector assembly includes a stepped O-ring configuration which, in the embodiment illustrated in FIGS. 3 and 4, includes external circumferential grooves 30a,30b, O-rings 32a,32b and complementary bore sealing surfaces 34a,34b of respectively different size and/or nominal diameter. The stepped O-ring configuration of the second preferred embodiment 54 of the present connector assembly serves to further shorten the amount of axial travel required to fully insert the connector assembly 54 within the housing bore 14, as measured from the point at which any portion of the connector assembly 54 first makes contact with any portion of the housing bore 14. In this manner, the present invention avoids communicating a false sense of a completed connection to the installer should he misinterpret the resistance generated by sliding engagement of two like-sized O-rings along the entire length of a like-diameter complementary sealing surface 34.

While the preferred embodiments of the invention have been disclosed, it should be appreciated that the invention is susceptible of modification without departing from the spirit of the invention or the scope of the subjoined claims.

I claim:

1. A connector assembly for coupling a tube to a bore formed in a housing thereby to establish fluid communication between the interior of said tube and the interior of said bore, said bore having an internal circumferential groove formed therein, said connector comprising:

an elongate tubular male insert having a first longitudinal end and a second longitudinal end, the first end of said male insert being adapted to receive said tube, the second end of said male insert being adapted to be received in said bore and having a contoured external surface defining an external circumferential locking flange;

a resilient locking element encircling the contoured external surface on said male insert, said locking element being expandable over the locking flange on the contoured surface of said male insert; and an annular guide encompassing said locking element and the locking flange on the second end of said male insert prior to insertion of said male insert into said bore, said guide acting to radially collapse said locking element about the contoured external surface of said male insert until said locking element is displaced from within said guide into the internal groove in said bore by the locking flange on said male insert.

2. The connector assembly of claim 1, wherein said locking element is a garter spring.

3. The connector assembly of claim 1, wherein said bore further includes a circumferential sealing surface formed therein; and wherein said connector assembly further includes an external circumferential groove defined in the contoured external surface of said male insert, and an O-ring seated in the external circumferential groove defined in the contoured external surface of said male insert, said O-ring sealingly engaging the sealing surface of said bore upon insertion of said male insert into said bore.

4. The connector assembly of claim 1, wherein the first end of said male insert includes a plurality of axially-spaced external circumferential flanges for retaining said tube.

5. A method for coupling a tube to an bore formed in a housing thereby to establish fluid communication between the interior of said tube and the interior of said bore, said bore having an internal circumferential groove formed therein, said method comprising the steps of:

providing an elongate tubular male insert having a first longitudinal end and a second longitudinal end, the first end of said male insert being adapted to receive said tube, the second end of said male insert being adapted to be received in said bore and having a contoured external surface defining an external circumferential locking flange;

providing a resilient locking element about the contoured external surface on said male insert, said locking element being expandable over the locking flange on the contoured surface of said male insert;

radially collapsing said locking element about the contoured external surface of said male insert prior to insertion of said male insert into said bore;

inserting the second end of said male insert into said bore, whereupon the locking flange of said male insert acts to axially displace said radially collapsed locking element into the circumferential locking groove in said bore;

further inserting the second end of said male insert into said bore, whereby the locking flange on said bore radially expands said locking element into the locking groove in said bore such that said locking element passes over said locking flange, whereby said male insert is locked into said bore by said locking element; and attaching said tube to the first end of said male insert.

6. The method of claim 5, wherein said step of radially collapsing said locking element about said contoured external surface of said male insert includes encompassing said locking element with an annular guide having an internal surface of lesser nominal diameter than the external diameter of said locking element.

* * * * *